July 11, 1967 W. R. BISHOP 3,330,426
BALE STACK FORMING DEVICE
Filed Aug. 23, 1965 4 Sheets-Sheet 2
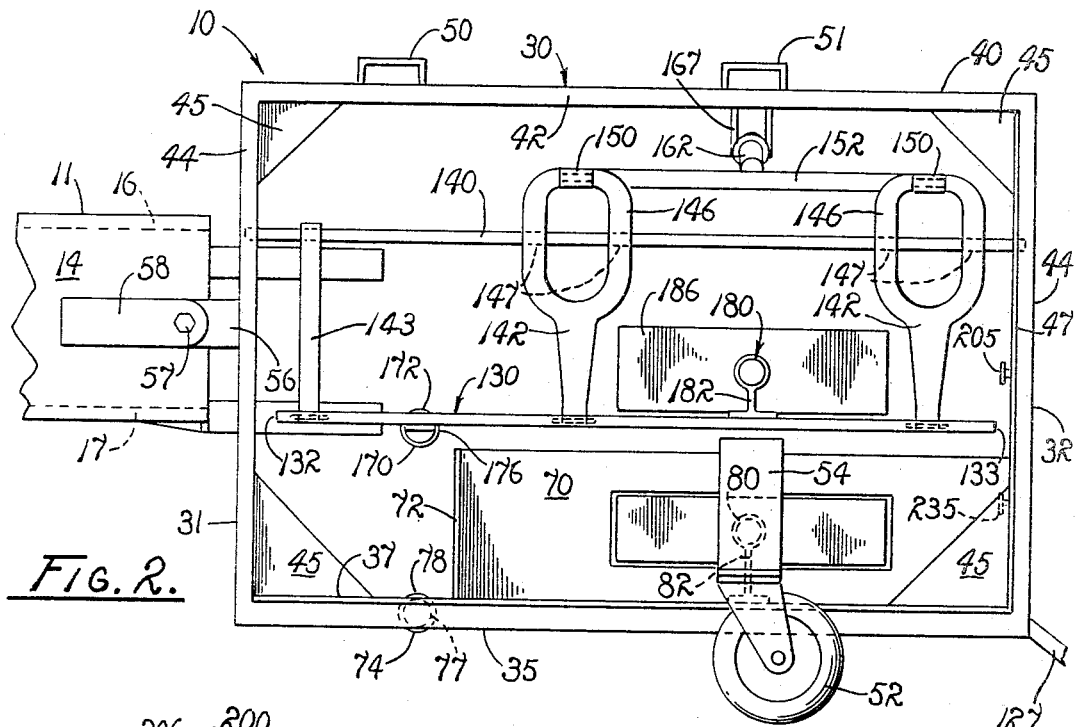
FIG. 2.
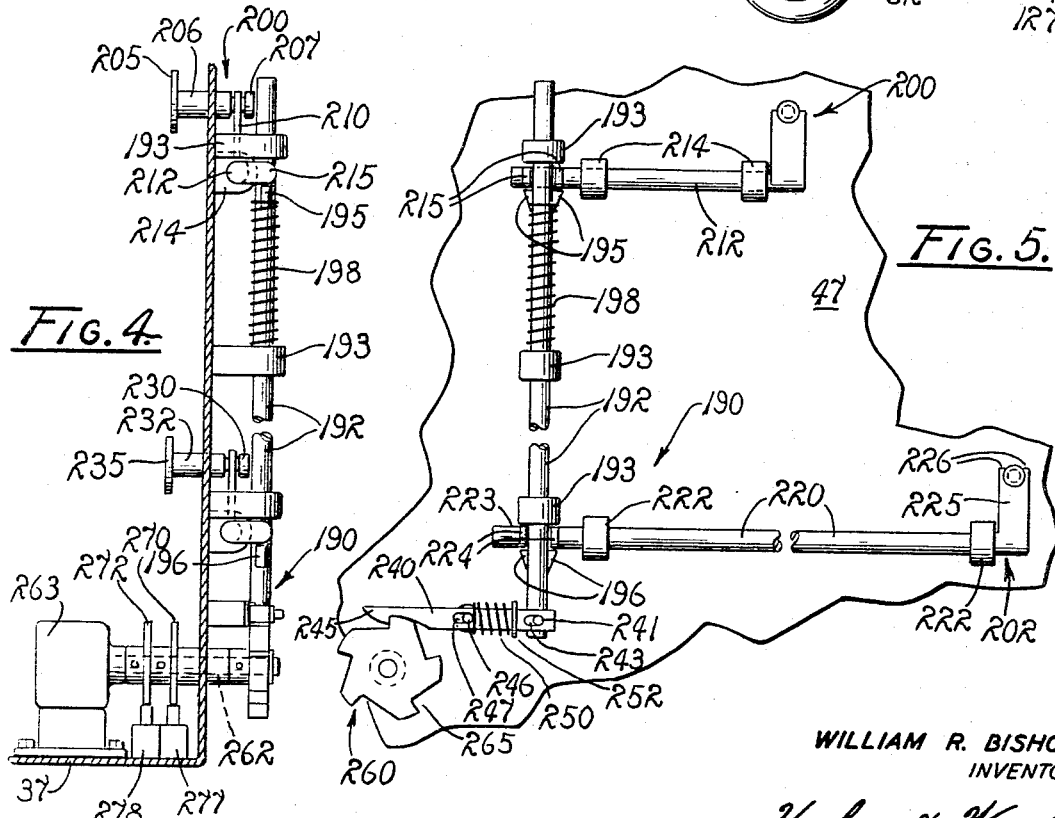
FIG. 4.
FIG. 5.
WILLIAM R. BISHOP
INVENTOR
Huebner & Worrel
ATTORNEYS

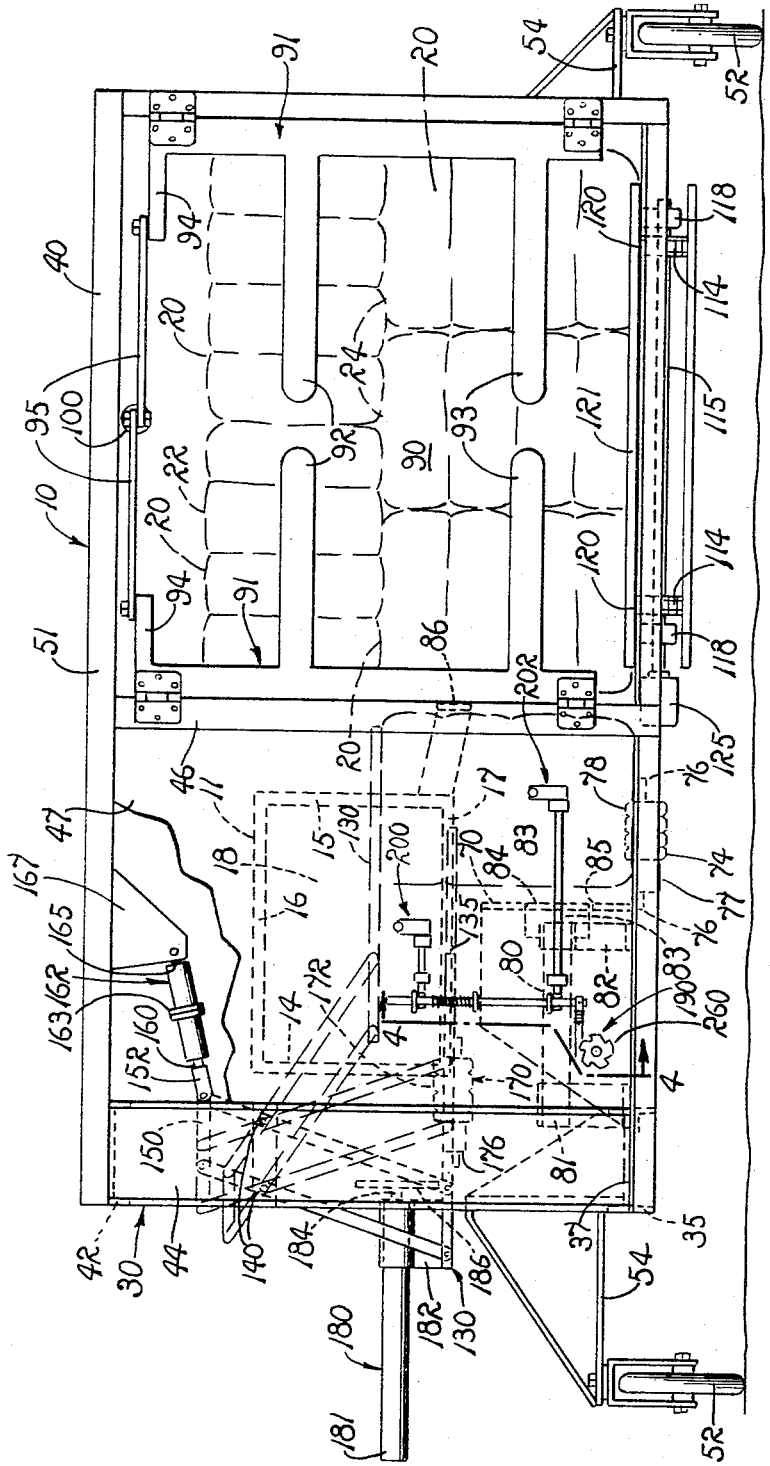

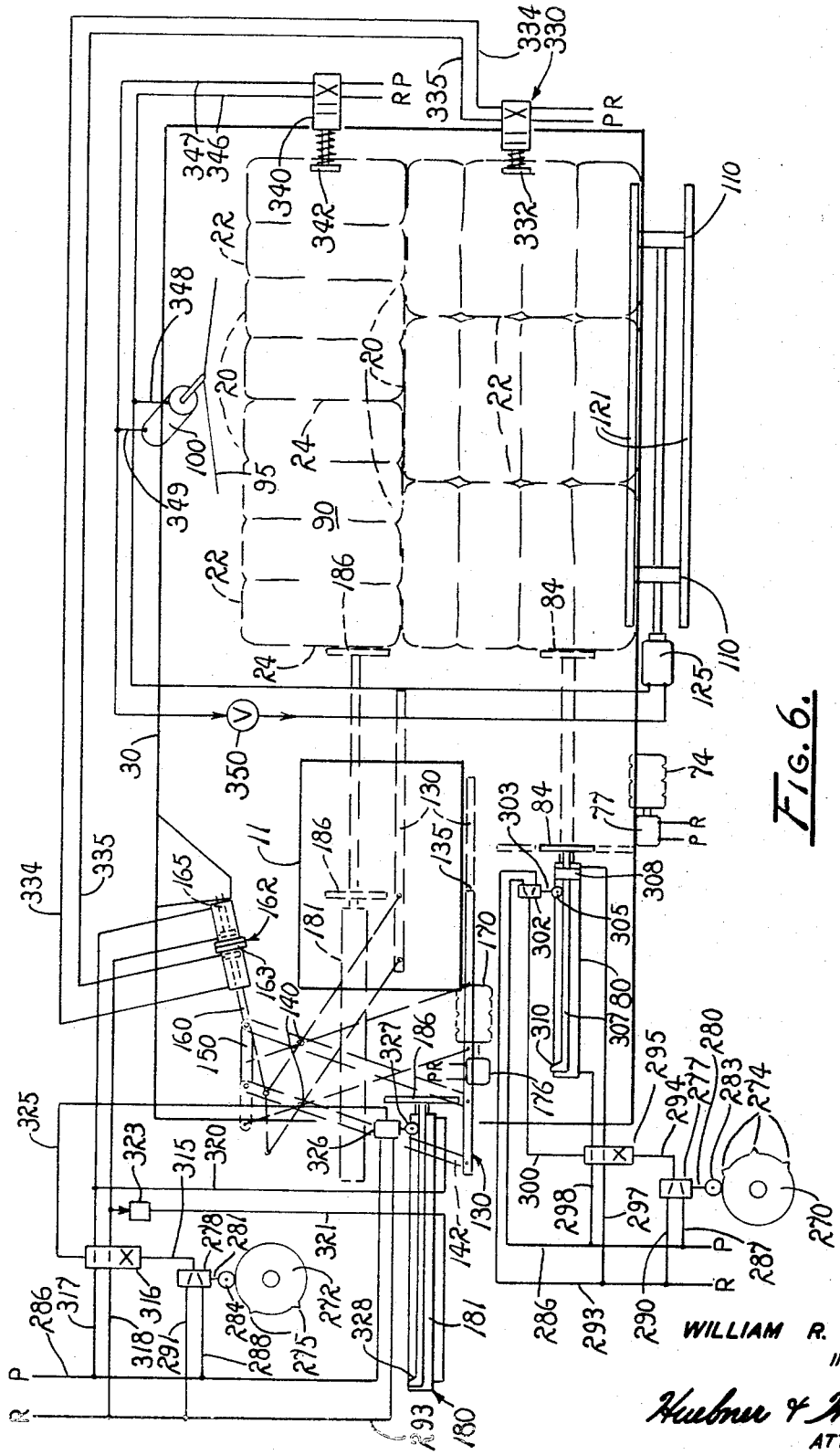

United States Patent Office 3,330,426
Patented July 11, 1967

3,330,426
BALE STACK FORMING DEVICE
William R. Bishop, P.O. Box 67,
Willow Ranch, Calif. 96138
Filed Aug. 23, 1965, Ser. No. 481,597
12 Claims. (Cl. 214—6)

The present invention relates to a bale stack forming device for balers and more particularly to such a device which forms a multi-layer, substantially square stack of bales with the bales arranged in the stack for optimum stability so as to maintain the bales in such stacked relation during discharge from the device in condition for subsequent handling by loading and stacking equipment.

The numeous bale stacking attachments for balers, as provided by the prior art, have been subject to certain difficulties which motivated a search for their solution, culminating in the present invention. Usually, the attachment consists of a relatively large trailer which is towed behind the baler. These large trailers seriously impair the maneuverability of the baler, are difficult to attach and disconnect from the baler, and cannot be conveniently manipulated when disconnected from the baler for parking or storing when not in use. It is desirable that the attachment be able to form a stack containing a relatively large number of bales so that fewer subsequent pickups are necessary by the bale stack handling equipment. In order to form a stack having a relatively large number of bales which is sufficiently stable to be handled by subsequently employed stacking and storing equipment, the bales of layers thereof in the stack are usually oriented in right angular overlapping relation. Inasmuch as the bales are discharged from the baler in longitudinally rearwardly extended relation, the prior attachments have provided complicated bale turning mechanisms for forming such right angularly related bale stacks. The additional room needed for turning the bales increases the width of the attachment and provides a considerable overhang beyond the sides of the baler. This, of course, contributes to the difficulties encountered in maneuvering the attachment, prevents the baler from working closely adjacent to fences and the like and, in some instances, increases the width of the attachment to a size wider than is permitted for legal highway travel.

Therefore, it is an object of the present invention to provide an improved bale stack forming device capable of forming a substantially square stack of bales of improved stability without turning the bales from their usual longitudinally extended discharge attitude from the baler.

Another object is to provide such an improved bale stack forming device capable of forming such a square stack of bales and unitarily discharging the stack therefrom.

Another object is to provide a bale stack forming device capable of forming a multi-layer stack of bales with individual layers thereof disposed in overlapping longitudinally aligned relation.

Another object is to provide a bale stack forming device which automatically arranges the first three bales in edgewardly disposed side-by-side relation and automatically places the next two bales in a substantially flat attitude in superimposed relation on the first layer of bales in longitudinally aligned relation therewith.

Another object is to provide a bale stack forming device which is easily connected and disconnected from an associated baler and is approximately the same width as most contemporary balers for improved maneuverability therewith.

Another object is to provide a bale stack forming device which is adapted to accommodate a wide variety of bale sizes without impairing stack formation or stack stability.

Another object is to provide a bale stack forming device which is capable of utilizing a system of hydraulically powered actuating members to manipulate the bales thereon.

Another object is to provide a bale stack forming device having a system of hydraulically powered actuating members which are fully automatic and triggered by bales received from the associated baler.

Other objects and advantages of the present invention will subsequently become more clearly apparent upon reference to the following description and accompanying drawings.

In the drawings:

FIG. 2 is a side elevation of the bale stack forming device of FIG. 1.

FIG. 3 is a rear elevation of the bale stack forming device of the present invention showing the bale positioning table in its several full line and dashed line operating positions.

FIG. 4 is a somewhat enlarged fragmentary transverse vertical section of the bale counting and trip mechanism, taken generally along the line 4—4 of FIG. 3.

FIG. 5 is a somewhat enlarged fragmentary view of the rearward end of the bale stack forming device showing the bale counting and trip mechanism thereof.

FIG. 6 is a schematic diagram of the hydraulic control system for the bale stack forming device of the present invention operatively associated with the powered components thereof.

Figure 1:
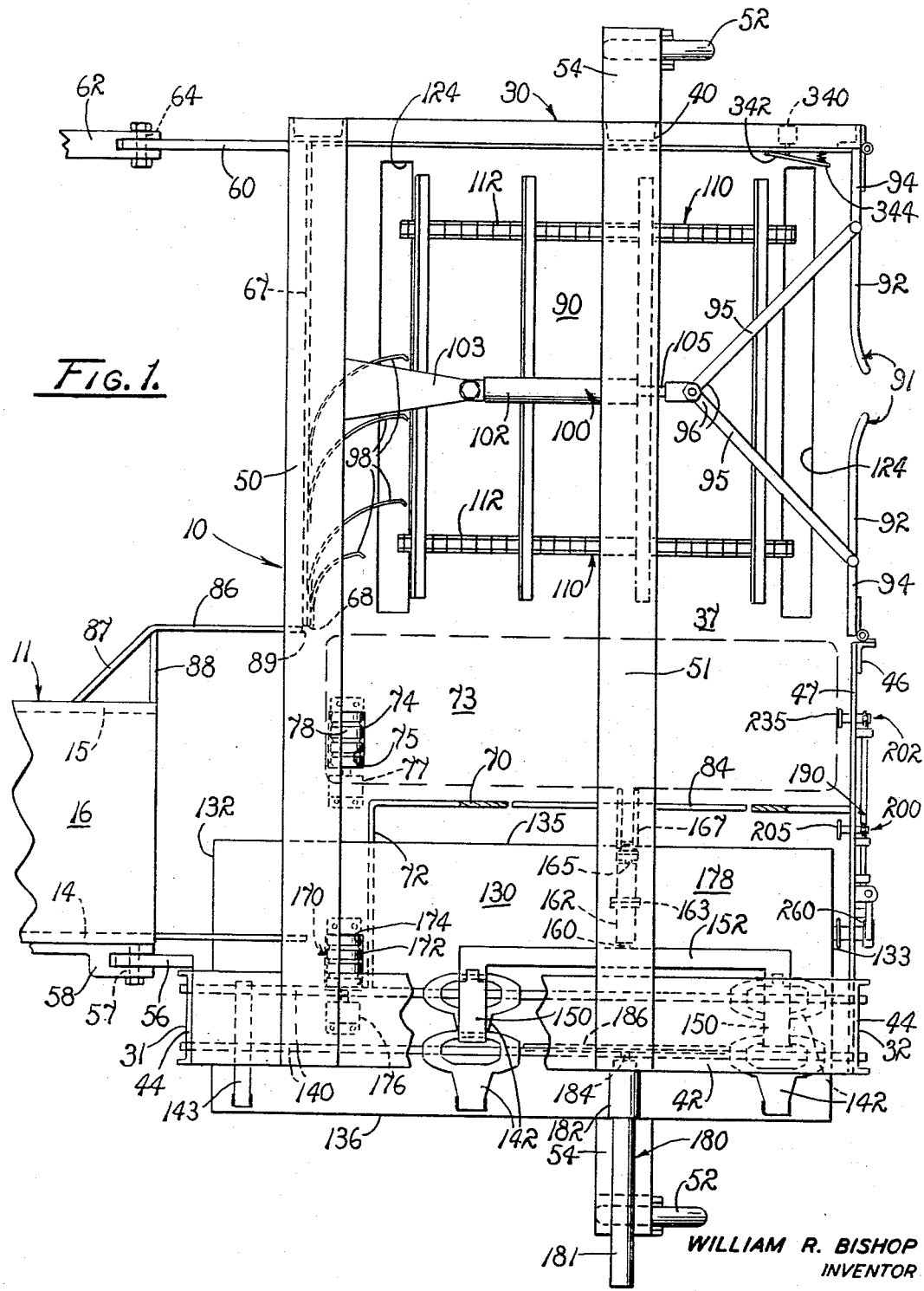
FIG. 1 is a top plan view of the bale stack forming device embodying the principles of the present invention shown connected to the bale discharge chute of a baler.

Referring more particularly to the drawings, a bale stack forming device embodying the principles of the present invention is indicated generally by the reference numeral 10. As best shown in FIGS. 1 and 2, the bale stack forming device is mounted on the rearward end of a bale discharge chute fragmentarily indicated at 11 which is rearwardly extended from a hay baler, not shown. The bale discharge chute provides substantially upright opposite side walls 14 and 15 and opposite upper and lower side walls 16 and 17, respectively. The walls of the chute circumscribe an elongated substantially rectangular bale discharge passage 18 through which a plurality of elongated bales, indicated in dashed lines at 20, are successively discharged rearwardly from the baler. Each of the bales of hay, straw, or other forage material is substantially rectangular in cross section to provide opposite flat sides 22 and opposite shorter edgeward sides 24 on which the bales may be edgewardly disposed. It is noted, however, that the bales are normally discharged from the chute 11 in positions disposed on their flat sides 22.

The bale stack forming device 10 provides an elongated frame 30 having predetermined forward and rearward ends 31 and 32, respectively. The frame includes a plurality of edgewardly disposed channel members 35 marginally extended about the frame in supporting relation to a floor plate 37. A superstructure 40 is mounted on the frame and provides a plurality of upper edgewardly disposed channel members 42 disposed in upwardly spaced substantially parallel relation above the lower channel members 35. The upper channel members are supported in such position by a plurality of substantially upright channel members 44 disposed in upwardly extended relation from the corners of the frame. It will be noted that the upper, lower, and upright channel members of the frame are substantially wider along the side of the frame nearest the baler discharge chute 11 and provide a plurality of corner gussets 45 interconnecting the channel members for additional strength. As best shown in FIG. 3, an upright support post 46 is disposed in interconnecting relation between the upper and lower channel members 35 and 42 at the rear end 32 of the frame intermediate the opposite sides thereof. A rear panel 47 is rigidly mounted on the frame in covering relation to the rectangular opening formed between the post and the reinforced side of the frame.

The frame 30 further provides a pair of transversely extended upper channel members 50 and 51 extended between the opposite sides of the frame individually adjacent to the forward end 31 thereof and intermediate the ends 31 and 32 of the frame. The frame is supported for earth traversing movement on a pair of opposite caster wheels 52 individually mounted for swiveling movement about substantially vertical axes on mounting brackets 54 outwardly extended from the sides of the frame adjacent to the rearward end 32 thereof.

As best shown in FIGS. 1 and 2, a forwardly extended mounting arm 56 is secured to the forward end of the frame for connection with the chute 11 of the baler. Such connection is provided by an elongated pivot shaft 57 extended through the arm and through a bifurcated bracket 58 on the side wall 14 of the chute. The frame further includes an opposite forwardly extended mounting arm 60 connected to the opposite side of the frame for connection to a bifurcated arm 62 rearwardly extended from the baler in spaced, substantially parallel relation from the chute by a pivot pin 64. A substantially upright forward wall 67 is mounted on the frame between the mounting arm 60 and the chute 11 and terminates in an inner vertical edge 68 somewhat short of the chute.

An elongated inner wall 70 is mounted in upstanding relation on the floor plate 37 of the frame 30 in longitudinally extended relation and in rearwardly spaced transversely offset relation to the chute 11. The wall is rigidly secured, as by welding or the like, to the rear panel 47 and at its opposite forward end has a right angularly related forward wall portion 72 extended downwardly toward the lower side of the frame. As best shown in FIG. 3, an elongated rectilinear path 73 for bale movement longitudinally of the frame is formed between the inner wall 70 and the plane of the upright post 46 on the frame. A toothed bale drive roller 74 is mounted in an opening 75 through the floor plate 37 of the frame closely adjacent to the forward wall portion 72 of the inner wall 70 by opposite end brackets 76. The roller is continuously driven by an hydraulic motor 77 for driving the roller about its axis laterally disposed with respect to the direction of travel of the frame. The roller includes an upper peripheral portion 78 extended upwardly into the path of bale travel 73 for conveying the bales deposited thereon rearwardly through the path toward the rear end 32 of the frame.

An hydraulic bale shifting jack 80 has a cylinder end 81 mounted on the floor plate 37 of the frame 30 by a bracket 82. The jack includes a rod end 83 which mounts an elongated rectangular bale shifting plate 84 which is extendable through an opening 85 in the inner wall 70 for movement laterally through the bale conveying path 73. An elongated bale constraining arm 86 is rearwardly extended from the side wall 15 of the chute 11. The arm has an angularly bent forward end 87 secured to the side 15 of the baler, as by welding or the like, and a brace 88 extended therebetween. The arm terminates in a rearward end 89 at the inner edge 68 of the forward wall 67 of the frame to provide an opposite wall for the bale conveying path 73 but in forwardly spaced relation to the inner wall 70 of the path.

A bale stack forming station, generally indicated by the reference numeral 90, is located on the frame 30 rearwardly of the forward wall 67 and in laterally disposed relation from the bale conveying path 73 opposite to the inner wall 70. A pair of swinging doors 91 providing upper and lower slats 92 and 93, respectively, are individually pivotally mounted on the upright post 46 and the adjacent corner channel member 44. The doors include upper arms 94 disposed in the plane of the slats which individually mount actuating links 95 extended inwardly of the forming station and provide overlapping inner ends 96. An hydraulic jack 100 provides a cylinder end 102 pivotally mounted on a bracket 103 secured to the forward upper channel 42 of the frame 30. The jack includes a rod end 105 pivotally mounted on the inner ends 96 of the links. A plurality of curved leaf springs 97 of substantially flat spring steel material are secured to the rearward side of the forward wall 67 of the frame 30 in laterally spaced relation and extended inwardly of the bale stack forming station 90. The leaf springs flexibly engage the ends of the bales to accommodate various bale lengths and maintain them rearwardly within the forming station in an upright position prior to completing each stack of bales therein. A shorter leaf spring 98 is similarly disposed within the forming station adjacent to the bale path 73 so as to provide a minimum of resistance to initial entry of bales into the forming station. The springs thereby prevent tipping of the bales during travel of the frame over rough terrain.

A pair of bale stack ejecting conveyors 110 are mounted on the floor plate 37 within the bale stack forming station 90 in transversely spaced substantially parallel relation. Each conveyor includes an endless chain 112 trained about longitudinally spaced sprockets 114 which are mounted for rotation on shafts 115 journaled in bearing blocks 118 secured beneath the floor plate. The chains include upper runs 120 having a plurality of spaced flight bars 121 extended therebetween for movement through elongated openings 124 in the floor plate and are driven by an hydraulic motor 125 connected to the rearwardly disposed shaft for rearward movement toward the doors 92. An elongated ramp 127 is pivotally mounted on the frame beneath the doors in trailing relation to the stack forming station.

A bale positioning table, generally indicated by the reference numeral 130, is mounted for lateral swinging movement on the rearward end of the frame transversely adjacent to the bale stack forming station 90. As best shown in FIGS. 1 and 3, the table provides opposite forward and rearward ends 132 and 133, respectively, and opposite inner and outer sides 135 and 136. The table is pivotally mounted for lateral swinging movement within the frame on a pair of elongated support rods 140 rigidly secured in spaced substantially parallel relation in the upright channel members 44 at the side of the frame adjacent to the bale discharge chute 11. The table is suspended from the support rods adjacent to their rearward ends on a pair of powered arms 142 and supported adjacent to its forward end by a pair of idler arms 143. Each of the powered arms 142 has an upper annular portion 146 providing spaced bearings 147 on their respective support rods. Each pair of the powered arms 142 is interconnected at its upper end by a spacer link 150. An elongated tie bar 152 has opposite ends 153 individually pivotally mounted on the upper ends of the innermost arms 142 in interconnected relation. Intermediate the arms, the tie bar is connected to a rod end 160 of a double acting hydraulic jack 162. The jack includes an intermediate head portion 163 and an opposite rod end 165 pivotally mounted on a bracket 167 rigidly connected, as by welding, in depending relation from the rearwardly disposed upper channel member 51. Adjacent to the forward end 132 of the table 130 is provided a bale drive roller 170 identical to the drive roller 74. The roller is journaled in mounting brackets 171 bolted to the underside of the table and has an upper periphery 172 extended through an opening 174 in the table for motivating bales longitudinally rearwardly therealong. The roller is driven by a continuously rotating hydraulic motor 176 mounted therewith.

When the hydraulic jack 162 is disposed in its full line retracted position, the table 130 is disposed in a retracted bale tipping position, as shown in full lines in FIG. 3. In such position, the inner side 135 thereof is located in substantially longitudinally centered relation behind the bale discharge chute 11 of the baler. Upon extension of one end of the hydraulic jack 162, the table is swung inwardly of the frame to an intermediate dashed line position substantially fully aligned with the bale chute. In such a position, the table provides an auxiliary path 178 of travel for the bales 20 rearwardly of the frame 30. Upon extension of the opposite end of the hydraulic jack, the table is swung to an elevated position shown in dashed lines in FIG. 3 above the bale conveying path 73 on the frame.

An hydraulic jack 180 has a cylinder end 181 mounted on the bale positioning table 130 on a bracket 182 upwardly extended from the outer side edge 136 intermediate the powered support arms 142. The hydraulic jack 180 includes a rod end 184 which mounts an elongated substantally rectangular bale pusher plate 186 which, with the jack disposed in its intermediate dashed line position of FIG. 3, is disposed in a plane substantially aligned with the side wall 14 of the bale discharge chute 11.

As shown in FIGS. 3, 4 and 5, a bale counting and tripping mechanism 190 is mounted on the rear panel 47 of the frame. The counting mechanism provides an elongated substantially upright actuating rod 192 mounted for vertical sliding movement in a plurality of spaced bearing bosses 193 outwardly extended from the panel. The rod includes upper and lower integral protuberances 195 and 196, respectively, with the rod normally maintained in an upwardly disposed position by an elongated compression spring 198 circumscribing the rod between the upper protuberances and the intermediate bearing boss 193. A pair of upper and lower trigger devices 200 and 202 are individually extended through the panel in substantially aligned relation with the upper auxiliary path 178 of bale travel provided by the bale positioning table 130 and the bale conveying path 73 on the floor 37 of the frame 30.

As best shown in FIG. 4, the upper trigger 200 includes an actuating or trip button 205 mounted on an elongated shaft 206 extended through the rear panel 47 at the rearward end of the auxiliary bale path 178 and which has an outer grooved end 207. An upwardly extended forked arm 210 is mounted on an elongated shaft 212 rotatably supported on the outer surface of the panel by a pair of aligned bearing bosses 214. The opposite end of the shaft 212 is forked to provide a pair of opposite fingers 215 partially circumscribing the actuating rod 192 for engagement with the upper protuberances 195 thereon. The lower trigger 202 is constructed in a manner similar to the upper trigger except for its provision of a longer shaft 220 which is mounted for rotation in a pair of spaced bearing bosses 222 on the outer surface of the panel. The lower shaft also provides a forked end 223 having spaced fingers 224 partially circumscribing the actuating rod 192 for engagement with the lower protuberances 196 thereon. The opposite end of the shaft has an integral upright forked arm 225 having fingers 226 receivable within the outer grooved end 230 of a shaft 232 inwardly extending through the panel which mounts an actuating or trip button 235 at the rearward end of the bale path 73.

An elongated stop lever 140 is pivotally connected to the lower end of the actuating rod 192 on a pin 241 extended from the lower end of the rod through an elongated slot 243 in the lever. The lever provides an opposite notched end 245 and is pivotally mounted intermediate its ends on a pin 246 secured to the outer surface of the rear panel 47 of the frame 30 which is extended through an elongated slot 247 in the lever. A compression spring 250 is disposed about the lever between the pin 246 and an integral annular flange 252 on the lever normally to urge the lever to the right, as viewed in FIG. 5, or toward the lower end of the actuating rod 192.

A bale counterwheel 260 is mounted for rotation on an elongated drive shaft 262 outwardly extended through the panel 47 of the frame 30 in axially extended relation from an hydraulic motor 263 mounted on the floor plate 37 of the frame. The counterwheel provides a plurality of notched segments 265 corresponding in number to the number of bales to be formed in each stack within the bale stack forming station 90. The hydraulic motor is continually driven by a source of hydraulic fluid under pressure located on the baler or prime mover, not shown, for rotating the counterwheel in a counterclockwise direction, as viewed in FIG. 5, until stopped by receipt of the notched end 245 of the stop lever 240 within one of the notched segments 265 thereof.

An hydraulic control system, as best shown in FIG. 6, is provided for sequential operation of the various previously described hydraulic cylinders for motivating bales into and out of the bale stack forming station 90. Such sequential action is provided by a pair of camming discs 270 and 272 which are rigidly mounted in axially spaced relation on the drive shaft 262 between the hydraulic motor 263 and the bale counterwheel 260 within the frame 30. The camming disc 270 has three circumferentially spaced lobes 274 peripherally outwardly extended therefrom corresponding to the first three notched segments 265 on the counter wheel. The camming disc 272 provides two circumferentially spaced peripherally extended lobes 275 corresponding to the remaining two notched segments on the counterwheel. Each of the camming discs has a two-position spool valve 277 and 278 individually associated therewith. In addition, each of the valves has an outwardly extended spring biased spool actuating rod 280 and 281 which individually mount rollers 283 and 284 in rolling engagement against their respective cams.

The cam valves 277 and 278 are individually connected to a main supply conduit 286 by a plurality of inlet branch conduits 287 and 288 individually connected to their respective valves. The main supply conduit 286 is connected to a source of high pressure hydraulic fluid, such as a hydraulic pump on the baler or prime mover, not shown. A pair of outlet branch conduits 290 and 291 are individually connected to their respective camming valves and to a common main return conduit 293 which is connected to a reservoir for the hydraulic fluid in the system, also not shown. A pilot line 294 is outwardly extended from the camming valve 277 for connection at its other end to a four-way hydraulic control valve 295. The control valve 295 is disposed within a pair of conduits 297 and 298, the latter of which is connected between the main supply conduit 286 and the cylinder end 81 of the hydraulic jack 80 controlling the bale shifting plate 84. The conduit 297 is connected between the main return conduit 293 and the rod end 83 of the hydraulic jack 80. The opposite end of the control valve 295 has a pilot line 300 connected thereto which is connected at its opposite end to a reversing valve 302. Fluid under pressure in the pilot lines 294 and 300 is effective to shift the valve between two positions alternately for straight through or cross flow of fluid through the conduits 297 and 298.

The reversing valve 302 is also connected to the main supply conduit 286 and the main return conduit 293 and provides an extended spring biased spool rod 303 which mounts a cam follower roller 305 thereon. The roller engages an elongated camming bar 307 which is rigidly connected to the rod end 83 of the hydraulic jack 80. The camming bar is slidably supported on the cylinder end 81 of the jack by a bearing bracket 308 secured to the cylinder. The camming bar has a ramp portion 310 at its end adjacent to the cylinder which is engageable with the roller 305 to depress the spool rod 303 of the reversing valve 302.

The camming valve 278 has a pilot line 315 extended therefrom for connection to one end of a four-way hydraulic control valve 316. The control valve 316 is identical to the control valve 295 and is mounted within a pair of conduits 317 and 318 individually connected between the main supply conduit 286 and the opposite rod end 165 of the hydraulic jack 162 and between the main return conduit 293 and the corresponding head end 163 of the jack, respectively, for initial actuation of the bale positioning table 130.

Branch conduits 320 and 321 are individually connected to the conduits 317 and 318 for connection to the rod and cylinder ends, respectively, of the pusher plate hydraulic jack 180 on the bale positioning table 130. A two-way pressure relief valve 323 is disposed in the conduit 321 to provide the desired sequential extension of the jacks 162 and 180. A pilot line 325 is connected to the opposite end of the control valve 316 and at its opposite end to a reversing valve 326 having a roller 327 thereon for engagement with a cam 328 on the jack 180 identical to the reversing valve and cam arrangement for the hydraulic jack 80. A two-position valve 330 is disposed on the side of the frame 30 and has a spring biased pressure plate spool 332 extended into the lower section of the bale stack forming station 90. The valve 330 is connected at one of its sides to the main supply conduit 286 and main return conduit 293 and at its opposite side has a pair of conduits 334 and 335 extended therefrom. The conduits 334 and 335 are connected at their opposite ends respectively to the rod end 160 of the hydraulic jack 162 and to the corresponding head end 163 thereof.

A two-position unloading valve 340 is mounted on the side of the frame 30 adjacent to the valve 330 and has a spring biased spool mounted pressure plate 342 extended into the upper portion of the bale stack forming station 90. The pressure plate is rearwardly extended and terminates in a rearward end 344 closely adjacent to the doors 92 of the bale stack forming station. The unloading valve 340 is connected at one of its sides to the main supply conduit 286 and to the main return conduit 293 and at its opposite side provides a pair of conduits 346 and 347 extended therefrom. The conduits 346 and 347 are respectively connected by branch conduits 348 and 349 to the rod end and head end of the hydraulic door closing jack 100. The conduits 346 and 347 are also connected to the drive motor 125 for the ejecting conveyor 110. A one-way check valve 350 is disposed in the conduit 347 to prevent reverse flow and reverse rotation of the motor.

OPERATION

The operation of the described embodiment of the subject invention is believed to be clearly apparent and is briefly summarized at this point. Assuming that the baler is being operated in a field of hay, straw, or other forage crop, the bales 20 are periodically successively ejected from the chute 11 onto the bale positioning table 130. Initially the hydraulic jack 162 is in its fully retracted position, as shown in FIG. 3, which disposes the inner side edge 135 of the bale positioning table short of the center of the discharge chute so that when the bale is completely free of the chute it is tipped on its edge as it gravitates to the bale conveying path 73 from the table. Such edgeward deposit of the bale is insured by the bale constraining arm 82 which is engaged by the upper flat side 22 of the bale during such edgeward tipping thereof.

The bale is dropped on its edge or short side 24 in superimposed relation to the upper periphery 78 of the continuously rotating drive roller 74 within the path 73. Such deposit of the bale on the roller carires it longitudinally rearwardly of the frame through the path 73 of bale movement. Such movement continues until the bale engages the actuating button 235 of the lower trigger device 202. Upon bale engagement, the actuating button is depressed to swing the forked end 233 of the shaft 220 in a clockwise direction, as viewed in FIG. 4, which causes the opposite forked end 225 to be swung downwardly to depress the actuating rod 192 against its compression spring 198. This movement causes the stop lever 240 to be pivoted about the pin 241 intermediate its ends to raise the notched end 245 thereof upwardly free of engagement with the notched segment 265 of the counterwheel 260. The counterwheel is thereby released for rotation in a counterclockwise direction, as viewed in FIG. 5, by the continually rotating hydraulic motor 263.

As described, the drive motor 263 continually tends to rotate the counterwheel 260 which rotation is permitted only upon reelase of the stop lever 240. During such release, the compression spring 250 engaging the flange 252 on the stop lever shifts the lever to the right, as viewed in FIG. 5, through the elongated slots 243 and 247 therein so as to place the notched end 245 of the lever in position to engage the next notched segment 265 of the counterwheel when the actuating rod is returned upwardly to lower the notched end 245 of the stop lever downwardly to its original counterwheel engaging position.

As previously described, the camming discs 270 and 272 are mounted on the drive shaft 262 of the counterwheel 260 for rotation with the counterwheel. During such rotation of the counterwheel from the first notched segment 265 to the second notched segment, the first cam lobe 274 on the camming disc 270 depresses the spool rod 280 of the camming valve 277. This causes hydraulic fluid under pressure from the main supply conduit 286 to be connected through the cam valve to the pilot line 294 leading to the four-way hydraulic control valve 295. Such pilot line pressure shifts the control valve 295 to a position permitting high pressure fluid to flow from the main supply conduit 286 therethrough to the cylinder end 81 of the hydraulic jack 80. This pressure is effective to extend the rod end 83 of the jack to travel the bale shifting plate 84 laterally through the bale movement path 73. Such movement shoves the first bale 20 laterally into the bale stack forming station 90 with the rearward end of the bale engaging the leaf springs 97 and 98 which precludes the bale from tripping.

As the rod end of the jack 80 reaches the end of its stroke, the roller 305 on the spool rod 303 on the reversing valve 302 is depressed by engagement with the ramp portion 310 on the camming bar 307. Such movement opens the supply conduit 286 therethrough to admit high pressure fluid into the pilot line 300 connected to the opposite end of the control valve 295. Such movement reverses the flow of actuating fluid through the conduits 297 and 298 to cause retraction of the rod end of the jack and return of the bale shifting plate into the inner wall 70 of the frame prior to movement of a second bale along the path 73 of bale movement.

The identical operation occurs for the second and third bales which are successively positioned against the preceding bale and shoved farther laterally into the bale stack forming station 90. The first three bales are thereby positioned in the bale stack forming station on their edges in intimate side-by-side relation to form a solid lower layer for the stack and are longitudinally extended in the direction of travel of the frame 30. Upon movement of the third bale into the bale stack forming station, the first bale is laterally disposed adjacent to the opposite side of the frame during which placement it engages the pressure plate 332 of the two-position valve 330. This movement depresses the spool within the valve to position the same so as to provide a passage therethrough for hydraulic fluid under pressure from the main supply conduit 286 to flow through the conduit 335 extended from the valve to the head end 163 of the hydraulic jack 162. Such pressurization causes the rod end 160 of the jack to be extended to swing the bale supporting table 130 on its powered support arms 142 to its intermediate dashed line position shown in FIG. 6 substantially fully aligned with the bale discharge chute 11 of the baler. With the bale positioning table disposed in its intermediate position, the fourth bale discharged from the chute is fully received upon the table on its flat side 22 with the table providing an auxiliary path 178 of the bale movement on the frame 30.

During such positioning, the bale 20 is deposited on the upper periphery 172 of the drive roller 170 which is continually rotated on the bale positioning table 130 by the hydraulic motor 176. Such engagement conveys the bale rearwardly along the table in the auxiliary path 178 until engagement of the bale with the actuating button 205 of the upper trigger device 200. Upon such engagement, the actuating button is depressed to rotate its shaft 206 again to depress the actuating rod 192 to disengage the stop lever 240 from the counterwheel 260. Upon rotation of the counterwheel, the camming disc 272 is simultaneously rotated to position the lobe 275 thereon in depressing relation against the roller 284 of the camming valve 278. The spool within the camming valve is thereby shifted to permit high pressure fluid from the main supply conduit 286 to flow therethrough into the pilot line 315 to actuate the four-way control valve 316. Upon opening of the control valve, high pressure fluid from the main supply conduit 286 is permitted to flow through the conduit 318 to the head end 163 of the hydraulic jack 162 to extend the opposite rod end 165 thereof. Such movement causes the bale positioning table 130 to be swung on its support arms 142 to the elevated bale discharging position shown in dashed lines in FIG. 6.

Upon full extension of the hydraulic jack 162 to dispose the table in its elevated dahsed line position of FIG. 6, the pressure in the branch conduit 321 is raised sufficiently to open the high pressure relief valve 323 to divert the high pressure hydraulic fluid from the main supply conduit 286 into the cylinder end 181 of the hydraulic jack 180. Such pressurization of the cylinder end extends the rod end 184 thereof to advance the pusher plate 186 laterally of the table to shove the fourth bale thereon laterally into the bale stack forming station 90 in superimposed relation on the first layer of bales disposed therein. It is noted that the fourth bale, like the first three bales in the lower layer of the stack, is also longitudinally extended in the direction of movement of the frame 30. However, the fourth bale is disposed on its flat side 22 so as laterally to overlap the dividing edges of adjacent bales in the lower stack to provide the necessary stack stability.

Upon full extension of the rod end 184 of the jack 180, the camming portion 328 on the jack engages the cam roller 327 to shift the reversing valve 326. Such movement directs the flow of high pressure hydraulic fluid from the main supply conduit 286 therethrough into the pilot line 325 to shift the control valve 316. Such movement causes the opposite rod end 165 of the hydraulic jack 162 to be pressurized to retract the same and at the same time directs such high pressure fluid into the rod end 184 of the hydraulic jack 180 by way of the branch conduit 320 to permit simultaneous retraction of the pusher plate 186 and the bale positioning table 130 downwardly to its intermediate bale receiving position behind the bale discharge chute 11 in position to receive the fifth bale therefrom.

The identical operation is followed for the fifth bale which, during its insertion into the bale stack forming station, shoves the fourth bale across the lower layer of bales therein to the position shown in dashed lines in FIG. 6. As the fourth bale nears the opposite side of the frame within the forming station, it engages the pressure plate 242 of the two-position unloading valve 340. Upon shifting of the unloading valve, high pressure fluid from the main supply conduit 286 is directed therethrough and into the conduit 347 to pressurize the cylinder end of the hydraulic jack 100. Upon such pressurization, the rod end 105 thereof is extended to open the doors 92 of the bale stack forming station. At the same time, the motor 125 is energized to rotate the bale stack discharge conveyors 110 for moving the stack of bales 20 outwardly of the bale stack forming station.

During such discharge, the bales 20 slide rearwardly down the ramp 127 and into ground engagement in the same uniformly stacked configuration as formed in the bale stack forming station 90. Upon complete removal of the stack from the forming station, the rearward end 344 of the pressure plate 342 is released inwardly of the forming station automatically to reset the unloading valve 340. This permits hydraulic fluid to pressurize the rod end 105 of the hydraulic jack 100 through the conduit 346 to close the doors 92. At such time, the hydraulic motor 125 is stopped due to the check valve 350 in the conduit 347, and the system is thereby in condition for receipt of a successive set of five bales for deposit in the bale stack forming station 90 in the previously described manner.

In view of the foregoing, it is readily apparent that the structure of the present invention has provided an improved bale stack forming device which is effective to form a multi-layer substantially square stack of bales with all the bales arranged in longitudinally extended relation with respect to the direction of travel of the frame for optimum stability without requiring that the bales in the successive layers of the stack be disposed in right angular relation to each other. The device of the present invention is also effective unitarily to discharge the stack of bales therefrom in such precisely stacked relation and in such a stable relationship in the stack so as to be readily adapted for subsequent handling by the usual loading and stacking equipment. The device of the present invention is readily adapted to accommodate bales of various sizes without impairing the stability of the stack formed of such bales. Furthermore, the bale stack forming device of the present invention can be easily mounted and dismounted on most commercial balers without impairing their maneuverability or restricting their use close to fences and the like.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A bale stack forming device, adapted to be drawn behind a baler having an elongated bale discharge chute, comprising a frame; and bale positioning means movably mounted on the frame and having a position partially transversely offset from said discharge chute of the baler initially to receive and to tip a predetermined number of bales discharged from the chute edgewardly onto the frame, and said positioning means providing an alternate position substantially aligned with said discharge chute for fully receiving bales subsequently discharged therefrom so as to deposit such subsequent bales in superimposed relation on said bales previously discharged.

2. A bale stack forming device, adapted to be drawn behind a baler having an elongated bale discharge chute, comprising a frame; a bale stack forming station on the frame; bale positioning means movably mounted on the frame and having a position partially transversely offset from said discharge chute of the baler initially to receive and to tip a predetermined number of bales discharged from the chute edgewardly onto the frame and into said bale forming station, said positioning means providing an alternate position substantially aligned with said discharge chute for fully receiving bales subsequently discharged therefrom so as to deposit such subsequent bales in the bale forming station in superimposed relation on said bales previously disposed therein to form a substantially square stack.

3. A bale stack forming device, adapted to be drawn behind a baler having an elongated bale discharge chute, comprising a frame; a bale stack forming station on the frame; bale positioning means movably mounted on the frame and having a position partially transversely offset from said discharge chute of the baler initially to receive and to tip a predetermined number of bales discharged from the chute edgewardly onto the frame and into said bale forming station, said positioning means providing an alternate position substantially aligned with said discharge chute for fully receiving bales subsequently discharged therefrom so as to deposit such subsequent bales in the bale forming station in superimposed relation on said bales previously disposed therein to form a substantially square stack; and bale ejecting means mounted on the frame within said bale stack forming station unitarily to discharge the stack of bales from the frame.

4. A bale stack forming device, adapted to be drawn behind a baler having an elongated bale discharge chute, comprising a frame for receiving bales discharged from the chute; a bale stack forming station on the frame; bale positioning means movably mounted on the frame providing a position partially transversely offset from said discharge chute of the baler initially to receive and to tip a predetermined number of bales discharged from the chute edgewardly onto the frame; bale shifting means laterally movable on the frame to motivate said edgewardly disposed bales into said bale stack forming station, said bale positioning means providing another position substantially aligned with said discharge chute fully to receive bales subsequently discharged from the chute to deposit said subsequent bales in the bale forming station in superimposed relation on said bales previously disposed therein to form a substantially square stack.

5. A bale stack forming device, adapted to be drawn behind a baler having an elongated bale discharge chute longitudinally rearwardly extended therefrom, comprising a frame for receiving bales discharged from the chute; a bale stack forming station on the frame; bale positioning means movably mounted on the frame providing a position partially transversely offset from said discharge chute of the baler initially to receive and to tip a predetermined number of bales discharged from the chute edgewardly onto the frame; bale shifting means laterally movable on the frame to motivate said edgewardly disposed bales into said bale stack forming station, said bale positioning means providing another position substantially aligned with said discharge chute fully to receive bales subsequently discharged from the chute; and means borne by said bale positioning means to deposit said subsequent bales in the bale forming station in superimposed relation on said bales previously disposed therein to form a substantially square stack.

6. A bale stack forming device, adapted to be drawn behind a baler having an elongated bale discharge chute longitudinally rearwardly extended therefrom, comprising an elongated frame for directing bales discharged from the chute along a first rectilinear path of travel longitudinally of the frame; a bale stack forming station on the frame; bale positioning means movably mounted on the frame providing a position partially transversely offset from said discharge chute of the baler initially to receive and to tip a predetermined number of bales discharged from the chute edgewardly into said first path of bale travel on the frame; bale shifting means laterally movable through said first path of bale travel to motivate said edgewardly disposed bales from the path into said bale stack forming station, said bale positioning means providing another position substantially aligned with said discharge chute to provide an auxiliary path of travel for bales subsequently discharged from the chute longitudinally of the frame above said first path of travel; and means borne by said bale positioning means to deposit said subsequent bales in the bale forming station in longitudinally extended superimposed relation on said bales previously disposed therein to form a substantially square stack.

7. A bale stack forming device, adapted to be drawn behind a baler having an elongated bale discharge chute longitudinally rearwardly extended therefrom for ejecting bales in a substantially flat attitude, comprising an elongated frame for receiving bales discharged from the chute and for directing the bales along a first rectilinear path of travel longitudinally of the frame; a bale stack forming station on the frame laterally disposed from said path of travel; bale positioning means movably mounted on the frame providing a position partially transversely offset from said discharge chute of the baler initially to receive and to tip a predetermined number of bales discharged from the chute edgewardly into said first path of bale travel on the frame; bale shifting means laterally movable on the frame through said first path of bale travel to motivate said edgewardly disposed bales from the path into said bale stack forming station, said bale positioning means providing an alternate position substantially aligned with said discharge chute to receive and to provide an auxiliary path of travel for bales subsequently discharged from the chute in said flat attitude longitudinally of the frame above said first path of travel; means borne by said bale positioning means to deposit said subsequent bales in the bale forming station in longitudinally extended superimposed relation on said bales previously disposed therein to form a substantially square stack; and bale ejecting means mounted on the frame within said bale stack forming station unitarily to discharge the stack of bales from the frame.

8. A bale stack forming device, adapted to be drawn behind a baler having an elongated bale discharge chute longitudinally rearwardly extended therefrom for ejecting bales in a substantially flat attitude, comprising an elongated frame having a bale receiving floor for directing bales along a first rectilinear path of travel longitudinally of the frame; a bale stack forming station on the frame disposed laterally from said first path of travel; a bale positioning table pivotally mounted on the frame providing a position partially transversely offset from said discharge chute of the baler initially to receive and to tip a predetermined number of bales discharged from the chute edgewardly onto the floor of the frame and into said first path of bale travel; bale shifting means alternately laterally movable on the frame through said first path of bale travel successively to motivate said edgewardly disposed bales from the path into said bale stack forming station, said bale positioning table providing an intermediate bale receiving position substantially aligned with said discharge chute fully to receive and to provide an auxiliary path of travel for bales subsequently discharged from the chute longitudinally of the frame above said first path of travel, and an elevated position disposed in a plane above said bales previously deposited in said bale stack forming station; means borne by said bale positioning means to deposit said subsequent bales in the bale forming station in superimposed relation on said bales previously disposed therein to form a substantially square stack; and bale ejecting means mounted on the frame within said bale stack forming station unitarily to discharge the stack of bales from the frame.

9. A bale stack forming device, adapted to be drawn behind a baler having an elongated bale discharge chute longitudinally rearwardly extended therefrom for ejecting bales in a substantially flat attitude, comprising an elongated frame having a rearward end spaced from the baler and a bale receiving floor for directing bales along a first rectilinear path of travel longitudinally of the frame; a bale stack forming station on the frame disposed laterally from said first path of travel; a bale positioning table pivotally mounted on the frame providing a position partially transversely offset from said discharge chute of the baler initially to receive and to tip a predetermined number of bales discharged from the chute edgewardly onto the floor of the frame and into said first path of bale travel; bale shifting means alternately laterally movable on the frame through said first path of bale travel successively to motivate said edgewardly disposed bales from the path into said bale stack forming station, said bale positioning table providing an intermediate bale receiving position substantially aligned with said discharge chute fully to receive and to provide an auxiliary path of travel for bales subsequently discharged from the chute longitudinally of the frame above said first path of travel, and an elevated position disposed in a plane above said bales previously deposited in the bale stack forming station; pusher means borne by said bale positioning means to deposit said subsequent bales in the bale forming station in longitudinally extended laterally overlapping superimposed relation on said bales previously disposed therein to form a substantially square stack; and bale ejecting means mounted on the frame within said bale stack forming station unitarily to discharge the stack of bales from the frame.

10. A bale stack forming device, adapted to be drawn behind a baler having an elongated bale discharge chute longitudinally rearwardly extended therefrom for ejecting bales in a substantially flat attitude, comprising an elongated frame having a rearward end spaced from the baler and a bale receiving floor for directing bales along a first elongated path of travel longitudinally of the frame; a bale stack forming station on the frame disposed laterally from said first path of travel; a bale positioning table pivotally mounted on the frame providing a position partially transversely offset from said discharge chute of the baler initially to receive and to tip a predetermined number of bales discharged from the chute edgewardly onto the floor of the frame and into said first path of bale travel; bale shifting means alternately laterally movable on the frame through said first path of bale travel successively to motivate said edgewardly disposed bales from the path into said bale stack forming station, said bale positioning table providing an intermediate bale receiving position substantially aligned with said discharge chute fully to receive and to provide an auxiliary path of travel for bales subsequently discharged from the chute longitudinally of the frame above said first path of travel, and an elevated position disposed in a plane above said bales previously deposited in the bale stack forming station; pusher means borne by said bale positioning means to deposit said subsequent bales in the bale forming station in longitudinally extended laterally overlapping superimposed relation on said bales previously disposed therein to form a substantially square stack; bale ejecting means mounted on the frame within said bale stack forming station unitarily to discharge the stack of bales from the frame; and means powering said bale positioning table, said bale shifting means, said bale pusher means, and said ejecting means in sequential relation incident to said movement of bales along said paths of travel and through said bale stack forming station.

11. A bale stack forming device, adapted to be drawn behind a baler having an elongated bale discharge chute longitudinally rearwardly extended therefrom for ejecting bales in a substantially flat attitude, comprising an elongated frame having a rearward end spaced from the baler and a bale receiving floor for directing bales along a first rectilinear path of travel longitudinally of the frame; a bale stack forming station on the frame disposed laterally from said first path of travel; a bale positioning table pivotally mounted on the frame providing a position partially transversely offset from said discharge chute of the baler initially to receive and to tip a predetermined number of bales discharged from the chute edgewardly onto the floor of the frame and into said first path of bale travel; bale shifting means alternately laterally movable on the frame through said first path of bale travel successively to motivate said edgewardly disposed bales from the path into said bale stack forming station, said bale positioning table providing an intermediate bale receiving position substantially aligned with said discharge chute fully to receive and to provide an auxiliary path of travel for bales subsequently discharged from the chute longitudinally of the frame above said first path of travel, and an elevated position disposed in a plane above said bales previously deposited in said forming station; pusher means borne by said bale positioning means to deposit said subsequent bales in the bale forming station in longitudinally extended laterally overlapping superimposed relation on said bales previously disposed therein to form a substantially square stack; bale ejecting means mounted on the frame within said bale stack forming station unitarily to discharge the stack of bales from the frame; and hydraulic control means powering said bale positioning table, said bale shifting means, said bale pusher means, and said bale ejecting means in sequential relation incident to said movement of bales along said rectilinear paths and through said bale stack forming station.

12. The bale stack forming device of claim 11 wherein the hydraulic control means includes a continuously powered drive shaft; a plurality of cams mounted in spaced relation on the drive shaft; a plurality of valve members individually associated with said cams providing operating connection to said bale positioning table, said bale shifting means and said bale pusher means; a bale counting member mounted on the shaft having a plurality of segments corresponding to the number of bales in the stack; a stop member releasably alternately engageable with said segments of the counting member for holding the same against rotation; an elongated axially slidable rod pivotally controlling said stop member; tension means between the stop member and the rod for positioning the stop member in said holding position; and a pair of trip members controllably connected to the rod and individually extended into said rectilinear paths of bale movement at the rearward end of the frame for engagement by said bales in the paths to release said stop member from the counting wheel to permit rotary movement of the wheel and cams.

References Cited
UNITED STATES PATENTS

| | | |
|---|---|---|
| 2,999,608 | 9/1961 | De Ganahl. |
| 3,161,008 | 12/1964 | Shepley et al. _____ 56—474 |
| 3,170,584 | 2/1965 | Crawford et al. |
| 3,197,043 | 7/1965 | Unger _____ 214—6 |
| 3,243,028 | 3/1966 | Tufts _____ 56—474 |
| 3,260,380 | 7/1966 | Skromme et al. _____ 214—6 |

GERALD M. FORLENZA, *Primary Examiner.*

J. E. OLDS, *Assistant Examiner.*